March 4, 1952  R. C. BASTIEN  2,587,956
LIGHT PROJECTING APPARATUS
Filed May 28, 1948  2 SHEETS—SHEET 2
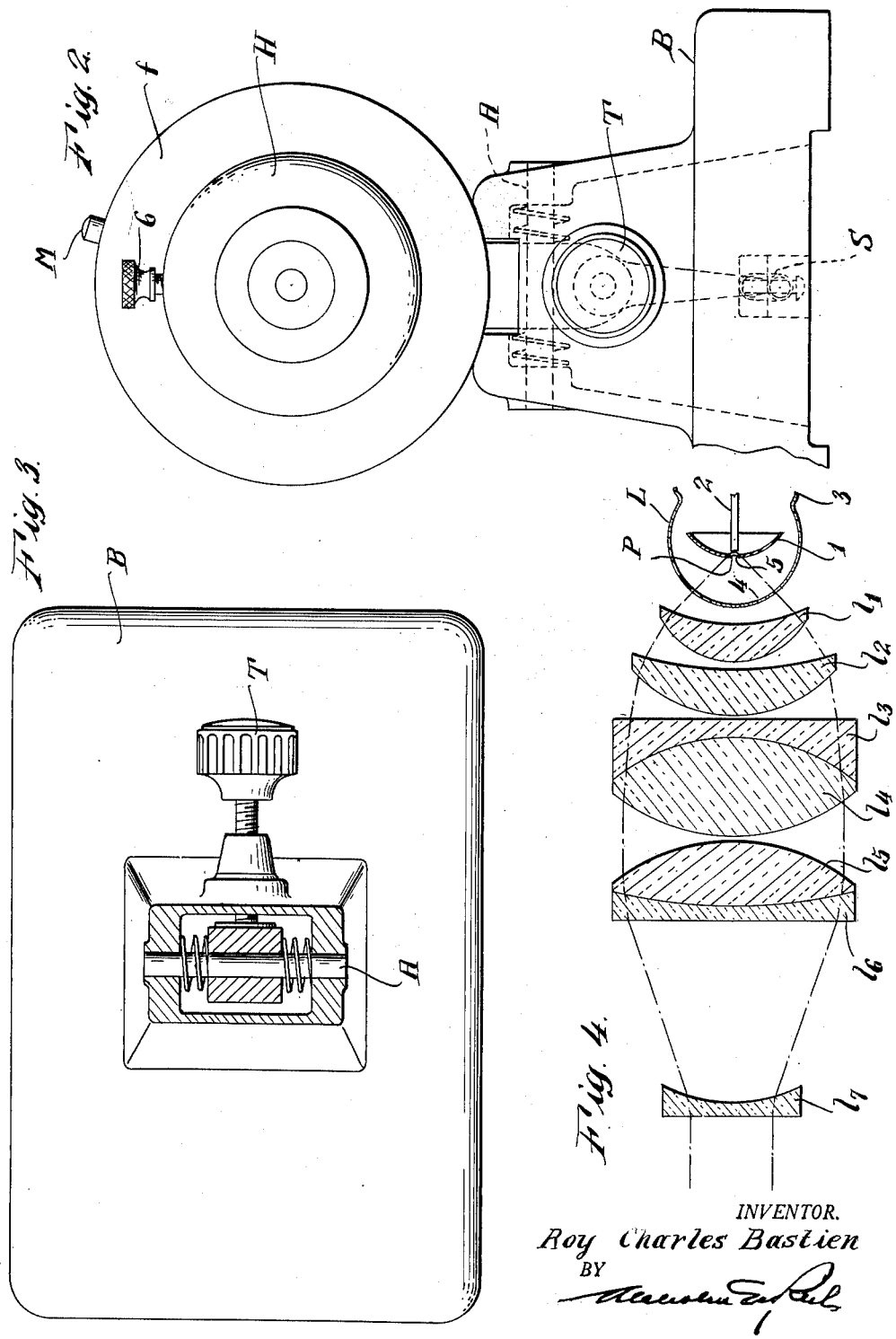
INVENTOR.
Roy Charles Bastien
BY
ATTORNEY Patented Mar. 4, 1952

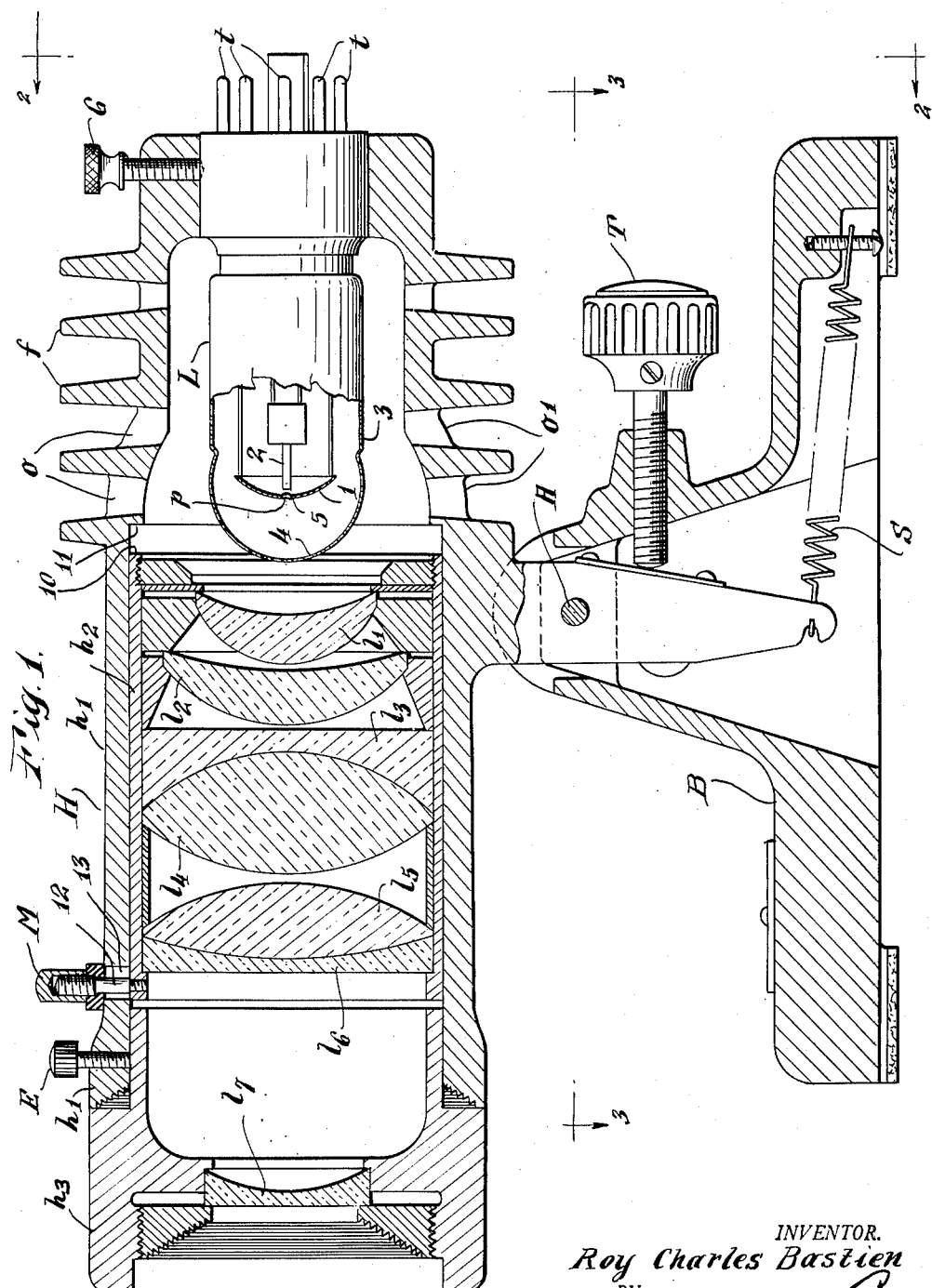

2,587,956

UNITED STATES PATENT OFFICE 2,587,956

LIGHT PROJECTING APPARATUS

Roy Charles Bastien, St. Albans, N. Y., assignor to Fish-Schurman Corporation, New York, N. Y., a corporation of New York Application May 28, 1948, Serial No. 29,739

3 Claims. (Cl. 240—2)

This invention relates to light projection devices and more particularly to such devices designed and adapted for use in association with microscopical instruments.

The object of the invention is to provide an improved light projection device.

Another object is to provide a light projection device utilizing, as a source of light radiation, a lamp known in the art as a concentrated-arc lamp.

A further object is to provide means adapting the concentrated-arc lamp as a source of radiation for microscopes.

Still another object is to provide an improved light projection device for illuminating the sub-stage condenser of a microscope with radiation of sufficient intensity for high quality photo-micrographic work.

Other objects will be apparent as the invention is more fully hereinafter disclosed.

In accordance with these objects I have devised an improved light projection device of wide utility in the art of illuminating objects and specified areas and which is particularly adapted, in the specific embodiment thereof hereinafter described and illustrated, for use in the illumination or irradiation of the sub-stage condenser of a microscope wherein medium to high intensity irradiation is desired.

The device of the present invention utilizes as a source of light radiation therein a light radiation generator of the type known in the art as a concentrated-arc lamp which produces a point source of light of high intensity and uniform brilliancy. A determined cone angle of radiation projected from this point source of light is collected by an optical system specially designed to convert the collected radiation into an emergent parallel-ray beam which may be made convergent, if desired, for the forming of an enlarged image of the point source of light at a determined distance away from the optical system at which point may be located the aperture of a sub-stage condenser of a microscope.

The optical system employed in the device to accomplish this desired result is a combination of two optical systems, each, per se, old and well known in the art. The first optical system consisting of a plurality of lens elements collecting a desired and determined cone angle of radiation from the point source and converting same into a parallel-ray beam, the said lens elements having as an optical system an equivalent focal length greater than the distance from the point source of radiation and the first surface of the first lens element thereof. The second optical system receives the parallel-ray beam from the first optical system and converts the same into a parallel-ray beam of lesser diameter while imparting to the combination of optical systems a lesser equivalent focal length which may even be less than the distance from the point source of light to the first face of the first lens element of the first system without altering said distance or the determined cone angle of radiation collected by the first system, but which in the specific embodiment approximates that of the distance between the point source of light and the first surface of the first lens element of the first said optical system.

The radiation projection device of the present invention is adapted for wide modification without essential departure therefrom to adapt the same to use in a plurality of different fields of utility, as one skilled in the art will recognize from the specific embodiment thereof which is hereinafter disclosed.

In the drawings, the specific embodiment of the present invention shown is one designed especially for use in association with microscopic apparatus as a source of irradiating light radiation for the sub-stage condenser of the microscope. Heretofore in the art a plurality of means supplying light radiation irradiating the sub-stage condenser of a microscope have been proposed. While many of these said means have been highly effective those most effective have involved the use of considerable equipment and a relatively large capital investment as well as skilled operators. The present invention aims to provide an economically practical device which is small, compact and easily operated by even unskilled operators and which requires little space and associated equipment to store or to operate bringing its use within the purview of any microscope under practically all conditions.

Referring to the drawings:

Fig. 1 is a side elevation sectional view of the light projection device of the present invention as adapted for this specific field of use;

Fig. 2 is a sectional end view of the same along plane 2—2 of Fig. 1;

Fig. 3 is a sectional view of the same along plane 3—3 of Fig. 1; and

Fig. 4 is a schematic view illustrating the optical system of the device of the present invention.

The device of the present invention, as shown in the drawings (Figs. 1 to 4, inclusive), includes, in combination, a light tunnel or housing H, consisting of two telescoping tubular parts or sections ($h_1$ and $h_2$), which tunnel is sustained upon a base B to be pivotally movable about a horizontal pivot axis A and provided with means, such as spring tension means S and manually operative threaded bolt T, to adjust and secure said housing H in any desired pivoted position; a point source of light radiation L disposed in one end of the light tunnel to project light radiation towards the opposite end of the tunnel; an end closure member $h_3$ closing the opposite end of the tunnel and providing an exit aperture of determined diameter for the emergent beam of radiation passing through the tunnel; an optical system including a plurality of lens elements ($l_1$ to $l_7$, inclusive), disposed in said tunnel and mounted in telescoping part $h_2$ as a unit for telescoping movement therewith, means M for manually effecting limited telescoping movement of part $h_2$ in part $h_1$ and means such as fins $f$ and opposite aligned openings o—o' to dissipate the heat energy of lamp L from telescoping part $h_1$.

Lamp L of this combination of elements, per se, forms no part of the present invention except as an element thereof, and is one which is old and well known in the art as a concentrated-arc type of lamp. This type of lamp is available in a plurality of different sizes, the particular size shown being that sold under the code number 321/40B. This lamp produces a luminous spot of sharply defined uniform brilliancy which is less than 1 millimeter in diameter or approximately 0.037 inch in diameter.

The problem involved in the adaptation of this point source of light radiation in devices of this character, particularly in the field of utility of the specific embodiment herein disclosed, is to provide an optical system therefor which will magnify this small diameter uniformly brilliant spot of light radiation to a diameter approximating that completely filling the entrance aperture of the sub-stage condenser of a microscope, corrected as to spherical and chromatic aberrations and as to coma, without employing an unreasonably great distance of throw between the projection device and the sub-stage condenser of the microscope. Normally a distance of throw of from about 12 to about 30 inches is desired. This desired requirement limits the optical system employed to magnify the point source of light radiation to one of relatively short focal length.

In addition to this limitation, with any given size concentrated-arc lamp of the above type, the minimum distance between the point source of radiation therein and the first surface of the lens system to be used therewith, is defined and limited by the enclosing glass envelope of the lamp and the necessary space gap between the envelope and the first surface of the lens system. In the specific type of lamp illustrated in the drawings the minimum distance obtainable between the point source of light and the first surface of the lens system approximates 15 millimeters.

In order to magnify the point source of radiation of this specific type of lamp having a diameter of .037 inch to a diameter sufficient to cover the sub-stage condenser aperture of a microscope within the throw distance desired (12 to 30 inches) I have found that the equivalent focal length of the optical system employed must approximate 16 millimeters.

In order to cover the field of a microscope using medium to high power objectives, the exit aperture of the lens system employed to magnify the point source of light radiation must be at least 28 millimeters in diameter.

This limitation in diameter of the exit aperture of the lens system limits the cone angle of light radiation to be collected by the system to about 100°. In order to collect this cone angle of radiation from the point source of light located at the minimum distance of 15 millimeters away from the first lens surface and to convert this into a parallel-ray beam having a diameter approximating that of the exit aperture of the lens system (28 millimeters) while maintaining an equivalent focal length of 16 millimeters and while providing corrections as to spherical and chromatic aberrations and coma, requires the use of a specially designed optical system which is more fully hereinafter described.

In the design of this optical system to meet the imposed limitations, above noted, I have found that it is possible to convert the 100° cone angle of collected radiation to a parallel-ray beam substantially fully corrected as to spherical and chromatic aberration and as to coma by the use of a lens combination which, per se, is old and well known in the art, which meets all of the above noted limitations except that of equivalent focal length. I have found that the minimum equivalent focal length obtainable in such a parallel-ray beam lens system under the imposed limitations approximates twice that desired. It is therefore necessary by the use of a cooperating lens system to reduce the equivalent focal length of the parallel-ray beam optical system to that desired without changing the compliance of the system to the limitations so far met or complied with, particularly the limitations of minimum spacing between the point source and the first lens surface and the cone angle of 100° radiation collected by the system.

This result is obtained by the use of a second cooperating lens system which is substantially a Galilean telescope lens system, which receives the parallel-ray beam from the first lens system and converts it to a second parallel-ray beam having a smaller diameter while imparting to the combination of lens systems the desired equivalent focal length without alteration of the compliance of the first lens system and the combination of lens systems to the spacing and cone angle collection limitations above identified.

In the combination of the two lens systems the amount of correction for spherical and chromatic aberration and for coma can be distributed between the two systems in any desired manner by means well known in the art such that the combination of optical systems is fully corrected.

In the specific embodiment illustrated, the construction of optical systems comprising the present invention is indicated as consisting of lens elements $l_1$ to $l_7$, inclusive. The first part of this combination of lens systems consists of lens elements $l_1$ to $l_4$, inclusive, which receive the 100° cone of light radiation emanating from the point source of light radiation L and convert the same to a parallel-ray beam having an equivalent focal length of about 34 millimeters which is approximately twice that desired.

The second part of this combination consists of lens elements $l_5$ to $l_7$, inclusive, which receive and reduce the parallel-ray beam projected from the first part of the system to a smaller diameter and which imparts to the combination of lens systems a focal length approximating 16 millimeters.

The two-part optical system is mounted in telescoping part $h_2$ to be moved therewith, the forward end 10 of the part $h_2$ being arranged with respect to the first lens element $l_1$ so that upon being moved telescopically into abutting position against shoulder 11 the distance between the first curved face of lens $l_1$ to the point source of radiation $p$ approximates 15 millimeters. This distance fixes the minimum distance of the point source $p$ to the face of lens $l_1$ and the manual adjustment provided by means M affords a means varying this distance over a range of several millimeters, from about 15 to about 18 for general focusing purposes.

Referring to the two parts of the optical system more particularly, the two parts, per se, are each old and well known in the art. The first part, including lens elements $l_1$ to $l_4$, as above indicated, is a typical lens arrangement for producing a parallel-ray beam of radiation from an outwardly diverging beam, the lens elements thereof being specifically designed optically to collect a 100° cone of light radiation emanating from the point source $p$ of lamp L and to convert this cone into a parallel-ray beam having a diameter approximately twice that of the emerging parallel beam of the combined systems.

In accomplishing this result, with the minimum distance of 15 millimeters, an equivalent focal length of about 34 millimeters is obtained in the system comprising the optical elements $l_1$ to $l_4$ forming the first part of the optical system. The equivalent focal length of 34 millimeters of this optical system is about twice that desired in the combination of systems.

The second part of the optical system, including lens elements $l_5$ to $l_7$, is specifically used for the purpose of reducing the equivalent focal length to about 16 millimeters without alteration of the minimum spacing of 15 millimeters and without changing the cone angle of collected radiation. This second part of the optical system is essentially a two-power Galilean telescope and reduces the parallel-ray beam immerging from the first part of the optical system to one of smaller diameter while providing in the combined systems an equivalent focal length of about 16 millimeters. Lens $l_7$ of this system is preferably fixedly located at the aperture opening of end closure member $h_3$ substantially as indicated in the drawings.

As a specific example of this combination lens system, lens elements $l_1$ to $l_7$, inclusive, are constructed as follows:

Lens $l_1$ is a concavo-convex lens comprised of optical glass having an $N_D$ value of 1.517 and a V (or gamma) value of 64.5 and having a diameter of 34.50 millimeters and a lens thickness at center of 9.0 millimeters, and a radius of convex curvature of 19.10 with a radius of concave curvature of 37.90.

Lens $l_2$ is a similar concavo-convex lens comprised of optical glass having an $N_D$ value of 1.517 and a V value of 64.5 and having a diameter of 47.00 millimeters, a lens thickness at center of 11.0 millimeters, a convex radius of curvature of 31.55 and a concave radius of curvature of 100.00.

Lenses $l_3$ and $l_4$ constitute a doublet lens, the lens $l_3$ being a plano-concave lens 56 millimeters in diameter and about 4.0 millimeters thick with a concave radius of curvature of 40.00. The lens $l_4$ is a double convex lens having a diameter of 56 millimeters, a thickness of 23.5 millimeters, the radius of convex curvature on one face being identical to the radius of concave curvature of lens $l_3$ and the opposite radius of convex curvature being 43.91. The glass composition of these lens elements have, respectively, $N_D$ and V values of 1.689 and 30.9, and 1.517 and 64.5.

These lenses $l_1$ to $l_4$ are mounted within tubular telescoping part $h_2$ with the aid of spacer elements, substantially as shown, to be spaced apart between adjacent surfaces at the axial centers a distance of .75 millimeter.

Lenses $l_5$ and $l_6$ constitute a second doublet lens, the lens $l_5$ being a double convex lens and the lens $l_6$ being a plano-concave lens, each having a diameter of 56 millimeters, with the thickness of $l_5$ being 14.6 millimeters and that of $l_6$ being 3.0 millimeters, and $N_D$ and V values of 1.517 and 64.5, and 1.689 and 30.9, respectively. The radius of curvature of the abutting concave and convex surfaces is 122.60 and the radius of curvature of the free convex surface of lens $l_6$ is 45.37. This doublet lens is also spaced .75 millimeter from the preceding doublet by means of a spacer element, substantially as shown.

Lens $l_7$ consists of a plano-concave lens having a diameter of 29.00 millimeters, a thickness of 3.0 millimeters, with a radius of concave curvature of 31.43. The $N_D$ and V values of this lens are 1.689 and 30.9, respectively. This lens is spaced 40.36 millimeters in front of the preceding doublet lens $l_5$ and $l_6$.

As mounted and assembled in the telescoping part $h_2$ of housing H, to constitute a unitary structure therewith, it is believed apparent from the drawings that when the part $h_2$ is telescoped inwardly as far as it will go to bring end 10 into abutting engagement with shoulder 11 on part $h_1$, a determined spacing is obtained between the face of lens $l_1$ and the point source of light $p$. This spacing as hereinabove noted is as close as is practical and approximates 15 millimeters. A set screw E is provided, passing through part $h_1$, to secure the part $h_3$ in which lens $l_7$ of the system is fixedly mounted so that this lens can be adjustably positioned in determined spaced position relating to the point source of light radiation P. Manually operating means M for adjustably moving telescoping part $h_2$ back and forth within the range 15 to 18 millimeters back focal length consists of a pin 12 passing through a slot opening 13 in part $h_1$ and threadedly engaging part $h_2$, by means of which pin the part $h_2$ may be manually moved the length of slot 13 backwards and forwards.

Lamp L, shown in mounted position in the end of tubular part $h_1$ of housing H, is in a position locating the point source of light at the axial center of the lens system with the cone of light radiation emanating therefrom directed towards the exit aperture of the housing H. As indicated in the drawings, lamp L consists of a disc-shaped plate electrode 1 overlying a crater electrode 2 and an enclosing light permeable envelope 3 provided with a dome portion 4 overlying the disc electrode 1. The point source of light $p$ is provided by a pin-point opening 5 in the disc electrode 1 located at about the axial center of crater electrode 2. A gaseous filling is enclosed by envelope 3 and electrodes 1 and 2 are connected through appropriate lead wires extending through the envelope 3 to pin terminals $t$ for electrical connection to a source of energizing electric current. Lamp L is normally held in mounted position in housing H by means of set screw 6.

The specific arrangement and design of housing H may be widely varied without essential departure from the invention as may also the method of mounting lamp L therein for light projection therethrough and as may also the method of rapidly removing the heat radiation generated by lamp means L. The specific design of each of these features of the invention is what has appeared to be the most practical design.

The specific arrangement for sustaining housing H for pivoting about a horizontal pivot axis and for securing the same in a desired pivoted position also may be widely varied without essential departure from the invention. The arrangement shown has been found to be most effective.

It is believed apparent from the above disclosure that the invention may be widely modified without essential departure therefrom and all such modifications and departures are contemplated as may fall within the scope of the following claims:

What I claim is:

1. A light projection device for illuminating the sub-stage condenser of a microscope, said device comprising a light tunnel, a point source of light radiation of the concentrated-arc type of lamp located in one end of said tunnel at the center axis thereof to project a cone beam of radiation through the tunnel to the opposite end thereof and an optical means disposed in radiation intercepting position in said tunnel to project an enlarged image of said point source a determined distance away from the end of said tunnel at which is located the aperture of a sub-stage condenser of a microscope, said optical means consisting of a positive lens system disposed adjacent the said point source in first radiation intercepting position and a Galilean telescope lens system disposed adjacent the positive lens system in second radiation intercepting position, said positive lens system consisting of a plurality of positive lens elements disposed in determined spaced relation, the first said element being located at approximately fifteen millimeters away from the said point source of light radiation, the plurality of elements of said positive lens system in combination being optically designed to intercept a determined cone angle of radiation from said point source of light radiation and to convert same into a parallel ray beam having a diameter greater than the desired emergent parallel ray beam and to have an equivalent focal length greater than the distance between the point source of light and the first optical surface of said system and the second said optical system having a plurality of positive and negative lens elements disposed in determined spaced relation and in determined spaced relation to the first said system, the plurality of elements of said second lens system being optically designed to convert the parallel ray beam from the first said system into an emergent parallel ray beam of a desired determined smaller diameter and to provide an equivalent focal length which is less than the distance between the point source of light radiation and the first optical surface of the first said lens system, the two said lens systems also being corrected for spherical and chromatic aberration and for coma.

2. The combination of claim 1, wherein the two said systems are mounted in said tunnel to be movable relative to each other within narrow limits thereby to obtain a converging emergent beam for focusing the enlarged image of the light source at varying distances away from the end of the said tunnel.

3. The combination of claim 1, including means for pivotally sustaining said tunnel about a horizontal axis, said means including means securing the tunnel in a desired position of pivotal adjustment.

ROY CHARLES BASTIEN.

REFERENCES CITED

The following references are of record in the file of this patent:

UNITED STATES PATENTS

| Number | Name | Date |
|---|---|---|
| 1,426,722 | Evans | Aug. 22, 1922 |
| 1,891,348 | Ellinger et al. | Dec. 20, 1932 |
| 1,932,817 | Gehrke | Oct. 31, 1933 |
| 2,138,665 | Ott | Nov. 29, 1938 |
| 2,289,575 | Critoph et al. | July 14, 1942 |
| 2,351,736 | Benford | June 20, 1944 |